Jan. 25, 1944.    R. L. LANDRY    2,340,064
INTERNAL COMBUSTION ENGINE WITH TELESCOPING PISTONS
Filed Sept. 4, 1942    3 Sheets-Sheet 1
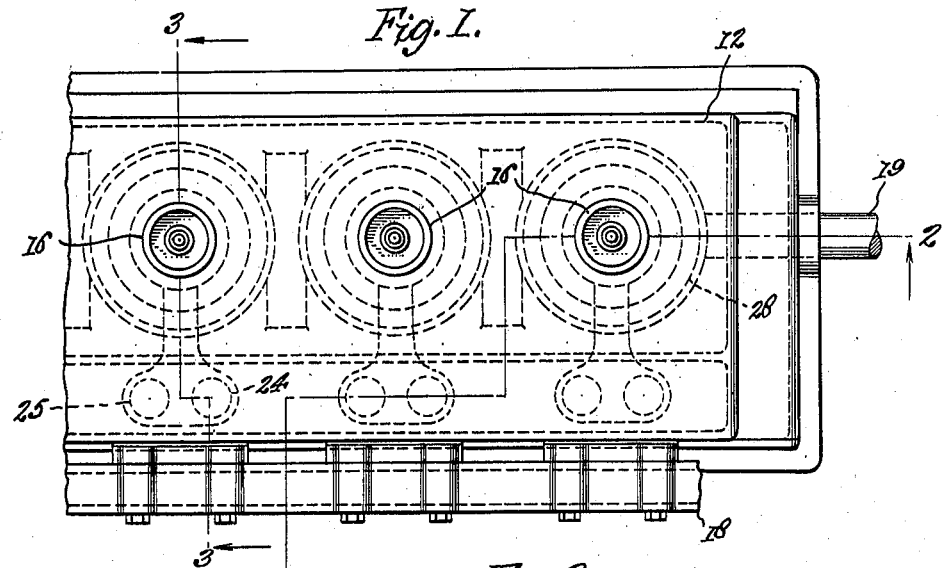
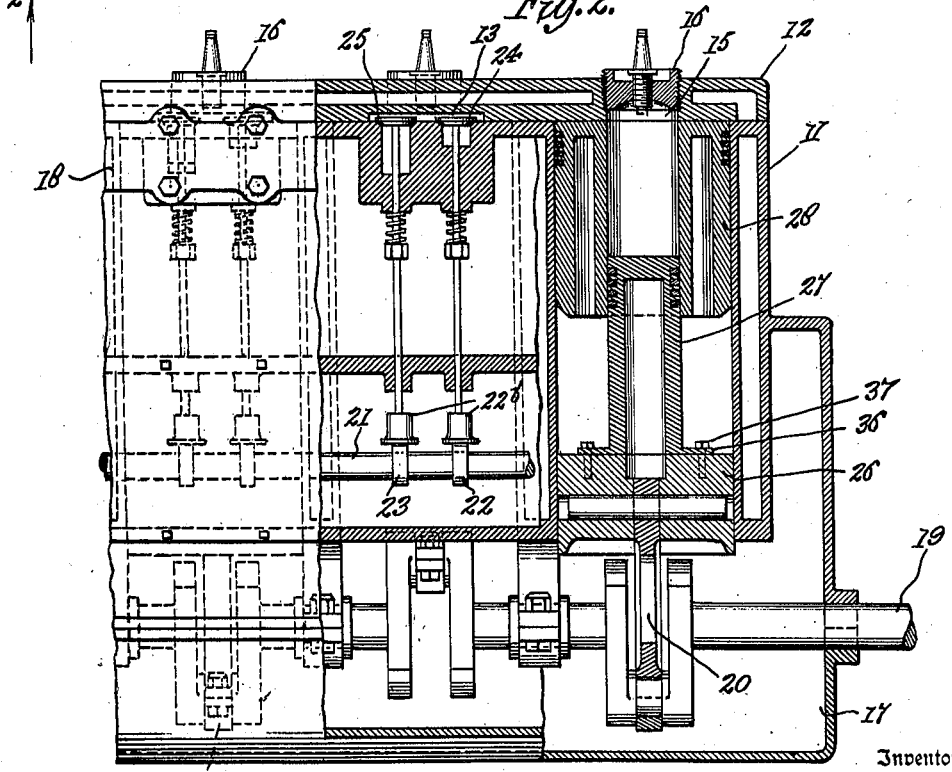
Inventor
R. L. Landry
C. P. Goepel
Attorney Inventor
R. L. Landry
by C. P. Goepel
Attorney

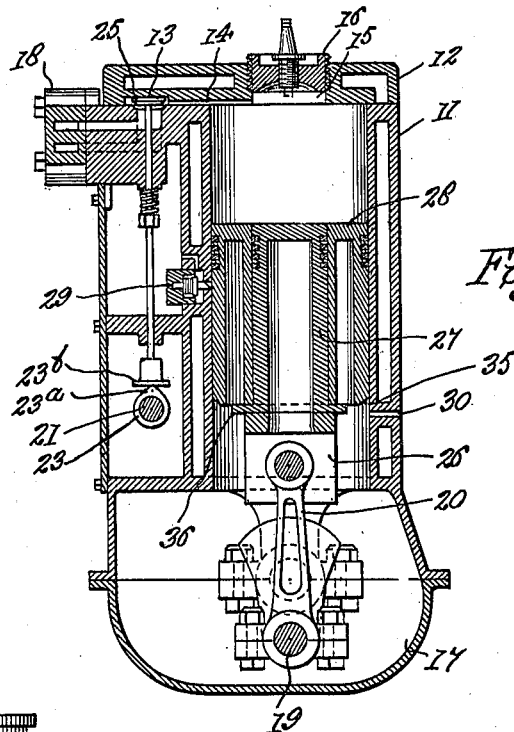
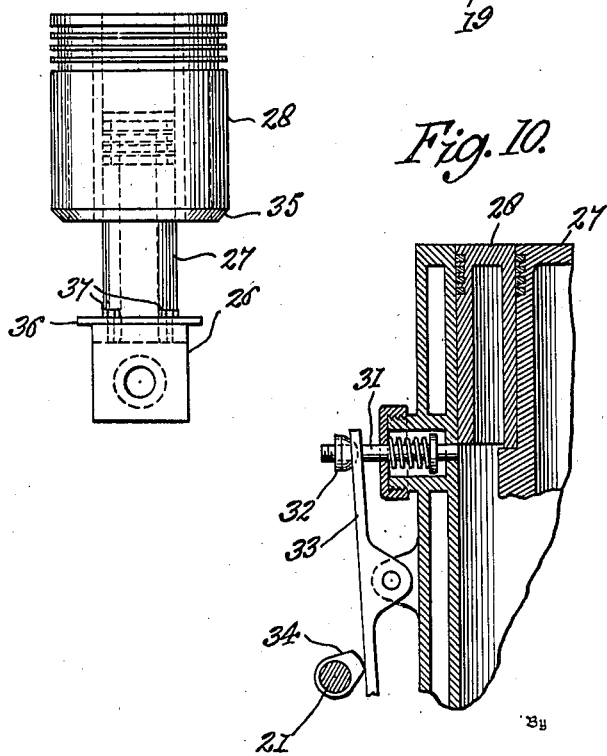
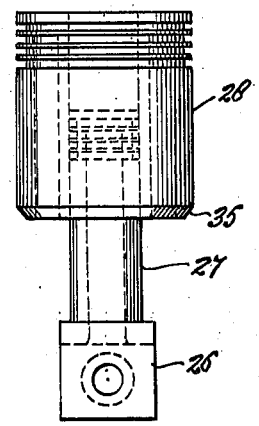

Patented Jan. 25, 1944

2,340,064

UNITED STATES PATENT OFFICE 2,340,064

INTERNAL COMBUSTION ENGINE WITH TELESCOPING PISTONS

Rosemond L. Landry, Jackson Heights, N. Y.

Application September 4, 1942, Serial No. 457,334

2 Claims. (Cl. 123—75)

The present invention relates to improvements in internal combustion engines and has for an object to provide a construction to obtain more power per unit of fuel than is possible with internal combustion engines as now constructed and in general use.

More specifically stated, the object of my invention is to produce a construction whereby the ratio of expansion is greater than the ratio of compression.

I am aware that various devices and designs have been developed to accomplish this result, but in all of these devices and designs, the increased space for expansion is provided in a separate compartment or an adjacent cylinder. In engines where added space is provided in one cylinder such cylinder has a bore of two diameters and is fitted with pistons of two diameters for two compartments in one cylinder. These compartments are separated by a bypass valve, which is placed in a passage connecting the two chambers formed by the two diameters of piston and cylinder bore. In engines where an adjacent cylinder is provided for increased space for expansion, a bypass valve is also required to be placed in a passage connecting the cylinders. All of these devices require three valves for their functioning, the valves being intake valve, bypass valve and exhaust valve. These designs involve a greater expense in construction and are not as efficient as an engine constructed and operating according to my present invention.

In the improved engine only two valves are required, expansion being confined to the cylinder in which the charge is compressed. The increased space for expansion is provided by means of a two-part telescoping piston functioning in upper end of a conventional cylinder. The charge is drawn in and compressed by the small piston, the large telescoping section of piston being held at the top end of the cylinder by a detent latch at the end of the compression stroke. On the expansion stroke the large telescoping section of piston is released from detent latch and descends with compression piston, thus increasing expansion space to area of bore in main cylinder.

A further object of the invention is to secure the advantages of an increased expansion ratio in existing forms of engines, and without changing present engine design, by the simple expedient of substituting for the standard piston a composite two-part telescoping piston of the present invention.

It is a still further object of the invention to provide for variable expansion ratios by the use of interchangeable composite telescoping pistons in which the smaller or compression pistons of the couple are of different diameters, while maintaining constant the overall diameter of the larger external piston section.

The invention has for its further purpose and object to provide means for varying the volume and capacity of the compression chamber in step with diametric changes in inner piston section.

With the foregoing and other objects in view, the invention will be more fully described hereinafter and more particularly pointed out in the appended claims.

In the drawings, in which like parts are denoted by the same reference characters throughout the several views, Fig. 1 is a top plan view, with parts broken away, of an improved engine constructed in accordance with the present invention.

Fig. 2 is a vertical longitudinal section taken on the line 2—2 in Fig. 1.

Figs. 3, 4, 5, 6 and 7 are cross sections, all taken on the line 3—3 in Fig. 1 and showing successive positions of piston sections in the various cycles of engine operation.

Figs. 8 and 9 are side elevational views respectively of separate and integral piston and crosshead assemblies, and Fig. 10 is a fragmentary vertical section of the cylinder and piston construction illustrating a modified form of detent and operating means.

Figure 3:
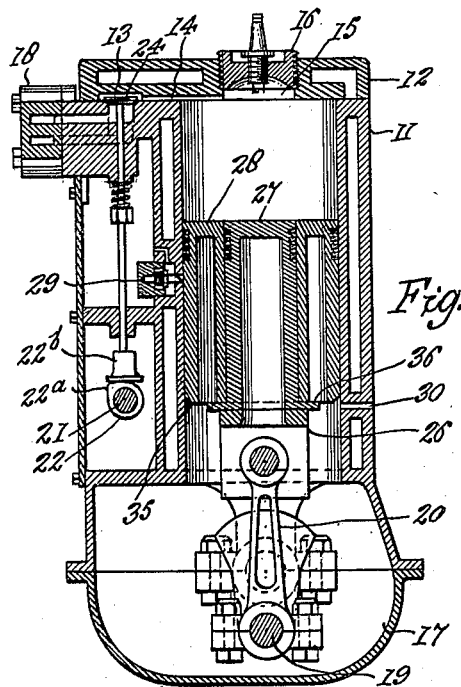

Referring more particularly to the drawings, 11 represents a cylinder block cast in one piece and containing any number of cylinders desired, which are water-jacketed in the usual manner. Cylinder bore is uniform in diameter and open at both ends, the bottom end of cylinder acting as a guide for the crosshead. The top end of the cylinder constitutes the compression and expansion chamber, formed by telescoping pistons and cylinder head 12, which is also water-jacketed. In the head 12 is a clearance space 13 to allow the valves to lift. A passage 14 leads from the valves to the cylinders. A cylinder 15 in cylinder block 12 provides space for compression. A screw threaded plug 16 provides means for exactly determining volume of space required for any predetermined ratio of compression at which the engine is to operate, this being important for when this space is relied on in casting, there is invariably a difference due to unequal casting and to rectify this requires that space be machine finished to obtain the exact volume required.

In the present engine any variation due to unequal casting is disregarded and the exact volume required is determined by screwing plug 16 to the proper depth. This arrangement also provides for changing the ratio of compression, should same be desired to conform to any change in grade of gasoline, which may be susceptible to higher compression, for it is obvious that the space above piston is determined by the distance between the piston head and plug 16.

The crank case 17 is of the usual type now in general use, as is also the intake and exhaust manifold 18.

The crankshaft is shown at 19 with its pitman or connecting rod 20. The cam shaft 21 and its cams 22 and 23 are in operative relation to the intake and exhaust valves 24 and 25.

The connecting rod 20 is coupled to a cross head 26, the sides whereof have convex outer surfaces to fit slidably in the base of the lower end of the cylinder. The upper part of the crosshead 26 carries the small section 27 of the two-part telescoping piston. Such small piston 27 is fitted with piston rings at its upper portion to form a working piston reciprocating in a cylinder bore made in the outer large piston section 28. The diameter of the large piston 28 may be that of the cylinder of a standard form of engine. The two pistons constitute a piston couple, the overall dimensions of which conform to present standard practice, by which the advantages of the invention are available to existing engines without modification save that involved in piston substitution.

The large piston telescopes over the small piston with the small piston 27 preferably in alinement with the combustion space 15 in the cylinder head. Such large piston 28 reciprocates intermittently in the engine cylinder and is not directly connected to any moving part of the engine.

A spring-projected detent 29 mounted in the cylinder block 11 is biased to a position in which its beveled nose extends beneath the beveled or inclined lower end 35 of the large piston 28. The large piston 28 is provided with one or more piston rings forming a working piston in the main cylinder, and this large piston is preferably U-shaped in cross section for lightness and cooling. A flange 36 on the crosshead 26 receives, supports and lifts the large piston 28.

The value of the spring of the detent 29 is such as to hold the large piston 28 elevated at all times except on the expansion stroke when the force of the explosion exceeds this value.

A vent 30 in bottom of cylinder is located so that it is not covered by crosshead. Air entering the space around small piston 27 when telescoping piston 28 is held in top position, becomes heated, and will be forced out through vent 30 when large piston 28 descends. Cold air will be drawn in when large piston 28 rises. This action will produce a cooling effect for pistons 27 and 28 in addition to that obtained from water jacket.

Figs. 4, 5, 6 and 7 show the positions of the parts at the start and end of each stroke. As there is no lapse of time between the end of one stroke and the beginning of the following stroke, it is obvious that the position of the piston is the same at the end of the upward stroke and the start of the downward stroke.

Figure 4:
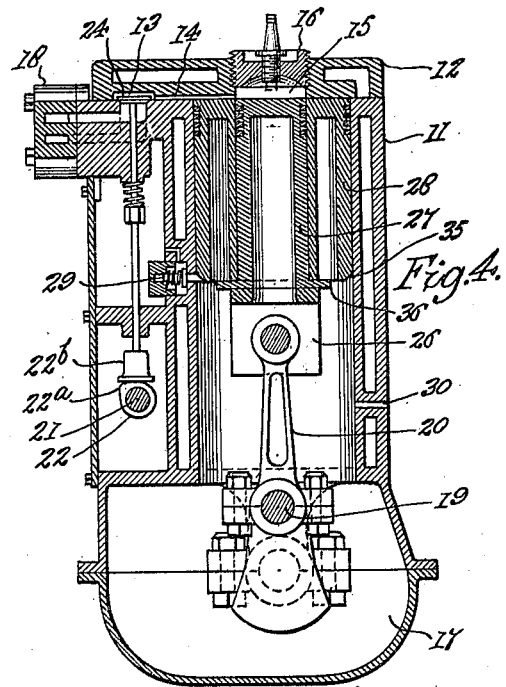

The operation is as follows:

Fig. 4 indicates the position of piston and detent latch at the start of the cycle which is the downward stroke drawing in the charge. The intake and exhaust valves are closed. The cam 22 which operates intake valve 24 has its peak 22ª in contact with the follower 22ᵇ and will open valve 24 as soon as piston starts downward. Detent latch 29 will hold the piston 28 and prevent it from descending with the piston 27. The charge will be drawn into the small cylinder formed by the telescoping pistons 27 and 28. While the piston 27 is descending, drawing in the charge, the cam is advancing and holding intake valve 24 open and allowing charge to be drawn into the bore of piston 28. At the end of the small piston 27 stroke, the complete charge will have been drawn into the bore formed by the telescoping piston 28. The cam has advanced, and its peak 22ª has released the follower 22ᵇ, and allowed intake valve 24 to close.

Figure 5:
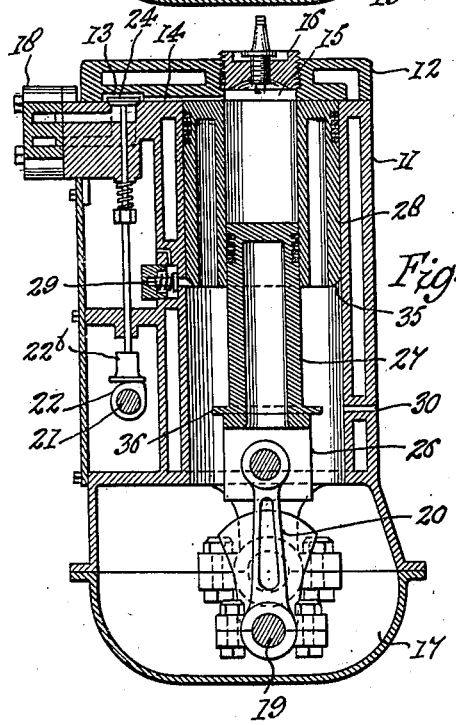

Fig. 5 shows the compression stroke about to start, all valves being closed. Piston 27 moves upward in the small cylinder formed by the bore in piston 28. The charge is compressed, cam 22 continuing its rotation.

Figure 6:
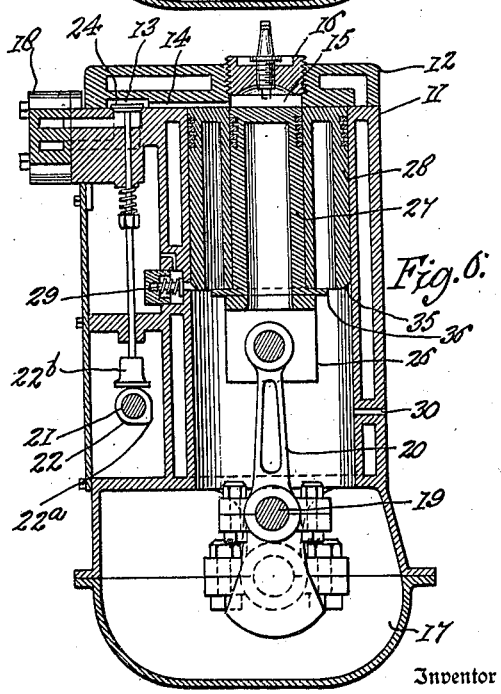

Fig. 6 shows the piston 27 at end of compression stroke. Combustion is taking place and expansion stroke starts. The pressure from expansion, forces the piston 28 to disengage latch 29 and piston 28 will descend with piston 27, its inner leg resting on the flange 36 at bottom of the piston 27. All pressure from both pistons is transmitted to crank shaft, both pistons descending together creating the increased space for expansion of gases. When the pistons reach bottom center, expansion will be complete. The exhaust cam, which is not shown, will be in contact with exhaust valve 25 which will open as the pistons start their upward and exhaust stroke.

Fig. 7 shows pistons about to start their upward and exhaust stroke. Exhaust valve 25 will open on the upward stroke. Piston 27 will also cause piston 28 to move upward, exhausting the expanded gases through exhaust valve 25. On reaching top of stroke gases will have been expelled. The exhaust valve 25 closes and the detent latch 29 reengages piston 28. The four cycles are completed; all parts are in the position shown in Fig. 4 and another cycle is started.

Figs. 8 and 9 illustrate different modes of constructing the small piston and crosshead.

Fig. 9 shows piston 27 cast integral with crosshead and Fig. 8 shows piston 27 and the crosshead cast separately and united by bolts 37. In changing the horse-power of the improved engine where the type of crosshead and piston shown in Fig. 9 is used, the crosshead 26 cast integral with the piston is changed. The type shown in Fig. 8 requires changing pistons. The crosshead need not be changed and is retained. In all types of internal combustion engines, be they of the general type in which the ratio of combustion and the ratio of expansion is the same or of the type that has a greater ratio of expansion than the ratio of compression, such engines when originally constructed have a definite rated horse-power at their specified ratio of compression. This rated horse-power cannot be changed by substitute parts and any small change that is possible is limited to any change made in compression ratio and alteration to cylinder bore. This would then establish another definite horse power to the engine and such engine could not be converted back to its original rating.

In the improved engine I can change the horse power to a higher or lower rating in horse power and again change back to its original rating consisting of its original parts and no parts will have been altered. The following explains how this is possible and accomplished.

Referring more particularly to Fig. 10, the shank 31 of the detent latch is exposed outside the cylinder and threaded to receive the adjusting nut 32. This nut forms an adjustable abutment for the engagement of the upper end of the rocker arm 33, the lower end of which is operatively contacted by cam 34 on camshaft 21. The cam 34 is timed to rock the device mechanically and positively to cause withdrawal of the detent latch at the appropriate time interval, whereby large piston 28 may descend in company with small piston 27 on the expansion stroke. With the use of such a detent, the cylinder 28 is not bevelled, the use of this form of detent control being the preferred form especially for large engines.

It will be particularly noted that combustion chamber 15 has a diameter substantially equal to that of the inner piston 27, and this combustion chamber may be increased or decreased in size by the adjustment 16. When the pistons are in the position shown in Figures 4 and 6, the end surfaces of the pistons are flush with each other and all the space between the end of the pistons and outer end wall of the cylinder is closed save for the continuation of the conduit 14.

The constructions shown and described are illustrative of the best modes known to me of carrying out the principles of the invention, but I do not desire to be restricted to such embodiments, as the invention is susceptible of many other forms. The inventive concept is defined in the following claims.

Having thus described my invention, I claim:

1. In an internal combustion engine having a crankshaft, a cylinder open at the top and bottom, a cylinder head for the top open end of the cylinder having ignition means, a composite piston comprising an expansion part reciprocating in said cylinder and a compression part therein of smaller area, reciprocating independently in said expansion part and coupled to the crankshaft, the faces of the composite piston being flush with each other during expansion and exhaust, and provided with a releasable detent means to hold the expansion part flush with the inner wall of the cylinder head during intake and compression while said compression part moves out and in on these two strokes, and having a part of said piston reacted upon by the explosion force to permit the expansion part to be driven out with the compression part on the expansion stroke, said detent being released by the pressure of the expansion part acted upon by the combustion pressure, said cylinder head provided with intake and exhaust valves offset from the cylinder bore, the inner wall of the cylinder head being flush with the end of the cylinder and with the faces of the composite piston at the top dead center, a centrally disposed cylindrical opening in said cylinder head having a diameter substantially equal to the diameter of the compression part of the piston and forming a combustion chamber, a plug for said opening adapted to close the same and to vary the operative space of said combustion chamber to any ratio of compression preselected for the respective areas, and separate channels in the cylinder head connecting said combustion chamber with the intake and exhaust valves respectively, whereby the compression part draws in the charge into the space of the cylinder volume on its down movement, and compresses said charge therein and in the combustion chamber on its return movement, both piston parts being forced downwardly flush with each other upon disengagement of the detent upon ignition of the charge, and both piston parts moving flush with each other on the return movement to exhaust the charge, the flame travel being confined substantially to a diameter equal to the compression part to complete combustion quicker than when the flame travel is substantially equal to the larger expansion part.

2. The structure of claim 1, in which the lateral walls of the combustion chamber are longitudinally aligned with the interior walls forming the bore in the expansion part and with the exterior walls forming the compression part.

ROSEMOND L. LANDRY.